United States Patent
Werner et al.

(10) Patent No.: US 7,037,239 B2
(45) Date of Patent: May 2, 2006

(54) SLIP CONTROL METHOD FOR A CLUTCH

(75) Inventors: Olaf Werner, Buehl (DE); Thorsten Krause, Buehl (DE); Klaus Kuepper, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/776,916

(22) Filed: Feb. 11, 2004

(65) Prior Publication Data
US 2005/0107215 A1  May 19, 2005

Related U.S. Application Data

(63) Continuation of application No. PCT/DE02/02913, filed on Aug. 8, 2002.

(30) Foreign Application Priority Data
Aug. 16, 2001 (DE) .............. 101 40 127

(51) Int. Cl.
*B60K 41/02* (2006.01)
(52) U.S. Cl. ...................................... 477/176
(58) Field of Classification Search ........... 477/176, 477/175, 181, 100
See application file for complete search history.

(56) References Cited

U.S. PATENT DOCUMENTS

| | | | |
|---|---|---|---|
| 4,457,411 A | * | 7/1984 | Hiramatsu ............... 477/176 |
| 4,662,494 A | * | 5/1987 | Wakiya et al. ............... 477/83 |
| 4,724,939 A | * | 2/1988 | Lockhart et al. ............ 192/3.3 |
| 4,800,781 A | | 1/1989 | Yasue et al. .................. 74/860 |
| 4,811,222 A | | 3/1989 | Watanabe et al. ........ 364/424.1 |
| 5,067,599 A | * | 11/1991 | Roder et al. ................ 477/176 |
| 5,086,889 A | * | 2/1992 | Nobumoto et al. ........... 477/62 |
| 5,176,234 A | | 1/1993 | Reik et al. .................... 192/52 |
| 5,322,150 A | | 6/1994 | Schmidt-Brucken ........ 477/176 |
| 5,403,250 A | | 4/1995 | Juergens .................... 477/176 |

(Continued)

FOREIGN PATENT DOCUMENTS

| | | |
|---|---|---|
| DE | 3624755 | 1/1988 |
| DE | 4011850 | 10/1990 |
| DE | 4241995 | 6/1994 |
| DE | 4426260 | 2/1995 |
| DE | 19745677 | 5/1999 |
| EP | 0494608 | 7/1995 |

(Continued)

*Primary Examiner*—Dirk Wright
(74) *Attorney, Agent, or Firm*—Davidson, Davidson & Kappel, LLC

(57) ABSTRACT

A method for automatically adjusting slip in an automatic friction clutch arranged between an engine and a gearbox of a motor vehicle. The clutch has a clutch-adjusting positioning drive which adjusts the clutch to a position which is defined by a position set-point signal. The clutch input speed and the clutch output speed are detected using speed sensors and a position set-point signal is produced according to the difference of the speeds (slip speed). The slip speed is equal to a predefined set slip value and is used as a control variable for the transmitted clutch torque. An engine torque is used as a control variable for the clutch instead of the clutch torque or as a complement thereto.

17 Claims, 1 Drawing Sheet

U.S. PATENT DOCUMENTS

| | | | |
|---|---|---|---|
| 5,632,706 A | 5/1997 | Kremmling et al. | 477/74 |
| 5,674,155 A | 10/1997 | Otto et al. | 477/176 |
| 6,066,072 A * | 5/2000 | Adachi | 477/176 |
| 6,217,481 B1 * | 4/2001 | Watanabe et al. | 477/169 |
| 6,565,483 B1 * | 5/2003 | Segawa et al. | 477/174 |

FOREIGN PATENT DOCUMENTS

| | | |
|---|---|---|
| EP | 1010606 | 6/2000 |
| GB | 2197049 | 5/1988 |
| GB | 2286862 | 8/1995 |
| GB | 2320531 | 6/1998 |

* cited by examiner

```
┌─────────────────────────────────────┐
│ Regulating the clutch via the slip  │
│ speed, the slip speed being a       │
│ control variable for the transmitted│ ~ 10
│ clutch torque                       │
└─────────────────────────────────────┘
                    │
┌─────────────────────────────────────┐
│ Using an engine torque as the       │
│ control variable for the clutch     │
│ instead of or in addition to the    │
│ clutch torque controlled via the    │ ~ 20
│ slip speed.                         │
└─────────────────────────────────────┘
```

FIG. 1

SLIP CONTROL METHOD FOR A CLUTCH

CROSS-REFERENCE TO RELATED APPLICATIONS

This is a continuation of International Patent Application No. PCT/DE02/02913, filed Aug. 8, 2002 and claiming the benefit of German Patent Application No. 101 40 127.2. Both applications are hereby incorporated by reference herein.

BACKGROUND INFORMATION

The present invention relates to a slip control method for a clutch which is situated between the engine and the transmission of a motor vehicle and is regulated via a differential speed between the clutch input speed and the clutch output speed.

The clutch has a positioning drive which allows the clutch to be adjusted into a position defined by a position setpoint signal. For this purpose, the clutch input speed and the clutch output speed are detected via rotational speed sensors, and a position setpoint signal is generated as a function of the difference between these rotational speeds (slip speed) in such a way that the slip is equal to a predefined setpoint slip.

Control methods of this type and devices for carrying out such methods are known from the related art. Thus, German Patent Application No. 42 41 995 A1, related to U.S. Pat. No. 5,403,250 which is hereby incorporated by reference herein, discloses a method and a device for adjusting the clutch slip of a propulsion engine of a motor vehicle in the downstream friction clutch as viewed in the direction of the force flux. A control variable formed from a characteristics map for the setpoint value of the clutch slip as a function of the operating point of the propulsion engine is made to act directly on the clutch actuator which makes it possible to adjust the clutch slip.

EP 0 494 608 B1, related to U.S. Pat. No. 5,322,150 which is hereby incorporated by reference herein, also discloses a system and a method for regulating the slip of an automated friction clutch situated between the engine and the transmission of a motor vehicle. The system includes a positioning drive which adjusts the clutch, as a function of the position setpoint signal, into a position defined by the position setpoint signal. The system also includes sensors for the clutch input speed and the clutch output speed, and a slip control device which generates the position setpoint signal as a function of the instantaneous difference of the rotational speeds detected, in such a way that the instantaneous difference between the rotational speeds is equal to a predefined setpoint speed difference. This system is further characterized by the fact that the slip regulating device is associated with a clutch characteristics curve memory which stores a position setpoint signal in the form of a characteristics curve as a function of data which represents the torque transmitted by the clutch in its setpoint position. The clutch characteristics curve memory generates the position setpoint signal corresponding to the value of the instantaneous engine torque detected by a torque detection device. The slip regulating device superimposes this position setpoint signal of the clutch characteristics curve memory on a regulating component generated by its regulator to generate the position setpoint signal. Using this method and this device, it is possible to maintain the clutch slip with a high quality of control.

Furthermore, DE 36 24 755 A1, related to British Patent Application No. 2197049 which is hereby incorporated by reference herein, describes a method for reducing torsional vibrations in the power train of a motor vehicle and for diminishing the noise caused thereby. The friction clutch situated between the engine and the transmission is controlled by a slip regulating circuit whose setpoint value generator controls the slip as a function of the structure-borne noise level. The maximum value of the slip is limited as a function of the engine speed, the maximum value decreasing to zero with increasing engine speed.

To isolate the power train of a vehicle from engine vibrations in vehicles having an automated clutch, in certain rotational speed ranges the clutch is operated at a low slip, as described previously. The isolation thus achieved considerably increases the ride comfort. However, the differential speed at the clutch must be adjusted relatively accurately for this purpose. An excessive slip results in increased power input and wear; excessively low slip may result in seizing of the clutch and thus in reduced ride comfort. Such a slip regulation generally assumes automated clutch actuation. According to the above-cited related art, such a slip regulation is implemented by modulating the clutch torque to be transmitted, i.e., via a control variable which acts upon the positioning drive of the clutch, opening or closing it to varying degrees. However, when such an intervention via a control variable takes place, the output torque of the clutch, i.e., the drive torque acting upon the vehicle, is modulated, which may feel unpleasant to the driver and diminishes the ride comfort.

BRIEF SUMMARY OF THE INVENTION

In contrast, an object of the present invention is to improve a method of the type named in the preamble in such a way that a slip speed at constant clutch torque or at a transmissible clutch torque changing with a constant gradient is adjustable as the control variable without the drive torque thus modified being noticeable to the driver.

The present invention provides a method of the type named in the preamble in such a way that, instead of or in addition to the modulated clutch torque transmissible by the clutch via the differential speed as the control variable for the clutch, an engine torque is used as the control variable for the clutch.

In this method for automatic regulation of the slip of an automated friction clutch situated between the engine and the transmission of a motor vehicle, which has a positioning drive for adjusting the clutch into a position defined by a position setpoint signal, the clutch input speed and the clutch output speed are detected by rotational speed sensors and a position setpoint signal is generated as a function of the difference between these rotational speeds (slip speed) in such a way that the slip is equal to a predefined setpoint slip. The engine has a controllable adjusting device for the torque which is generated, for adjusting or controlling the engine in such a way that the torque generated corresponds to a predefinable torque setpoint value. In addition to the position setpoint signal or instead of the position setpoint signal, a torque setpoint signal dependent on the slip is generated and supplied to the torque adjusting device in such a way that the instantaneous slip is equal to a predefined setpoint slip.

In an embodiment of the method, an instantaneous engine torque desired by the driver is determined from the position of the accelerator pedal and the instantaneous operating state of the engine, and this desired torque as a control variable for the clutch regulates the slip in such a way that the transmissible clutch torque is adjusted to the desired torque and modulated accordingly.

The control variable for the transmissible modulated clutch torque is advantageously filtered from sudden torque changes, low-frequency vibrations, and small changes in the desired torque which are unintended by the driver. This is accomplished in such a way that the rotational speeds for computing the slip and the torques are time-averaged values, so that very short-term changes in the rotational speeds and the torques are filtered out, i.e., smoothed by time-averaging.

In a refinement of the present invention, the instantaneous engine torque is regulated in such a way that a slip corresponding to the instantaneous operating state of the engine is set at the clutch, and this slip is kept constant.

The advantage of the present invention is essentially that the slip speed is adjustable at a constant transmissible clutch torque or at a clutch torque that changes at a constant rate without the driver sensing a modified drive torque. The adjusting device for the engine torque may be a controllable, automatically actuatable throttle valve or an ignition device for the engine. An engine equipped with such devices is referred to as electrically controllable for the purposes of the present invention.

An instantaneous torque desired by the driver can be determined from the accelerator pedal position and the instantaneous operating state of the engine such as the position of the throttle valve and the engine speed; this may also be accomplished via stored characteristics maps. In general, this torque is computed on-line in the engine controller anyway for controlling the engine. This torque is predefined for the controller as the setpoint torque signal. If the slip regulation according to the present invention is active, the transmissible clutch torque is adjusted to the torque desired by the driver and modulated accordingly. This adjustment of the clutch torque may, as mentioned previously, also be suitably filtered to suppress sudden torque changes, low-frequency vibrations, or small changes in the desired torque which are presumably unintended by the driver. For this purpose, values of the rotational speeds time-averaged in a known manner are used for computing the slip and for modulating the torques. At the same time, the engine torque is adjusted, for example, using a regulator which suitably modifies the position of the throttle valve and/or via a change in the ignition angle, in such a way that the slip which is required in this operating state and is optionally stored in the control electronics in tabular form, is adjusted and kept constant. As long as the fluctuations in the engine speed remain sufficiently small, so that the driver does not notice them, the actual engine torque may be modulated in a particularly advantageous embodiment for minimum exhaust gas emission. Thus, for example, a very rapid intervention in the internal combustion engine usually requires adjustment of the ignition timing, which may result in deteriorated exhaust conditions. If small fluctuations in the slip speed are acceptable, the intervention via the (slower) throttle valve may be implemented to optimize exhaust gas emissions. This value may be determined in preliminary tests and stored in the control electronics, together with its relationship with other parameters, in a tabular form. In another preferred procedure the transmissible clutch torque is regulated to a value below the torque desired by the driver. The difference between the torques may then be achieved via a fixed amount, for example, 10 Nm or a factor less than 1, for example, 0.93 to 0.96, in particular 0.95 by which the torque desired by the driver is multiplied to obtain the value to which the reduced clutch torque is to be adjusted. The value thus reduced is then supplied to the controller as the torque setpoint signal. The advantage of this procedure is that the controller does not need to increase the engine torque above the torque desired by the driver, but only a torque reduction is performed. Due to the torque reduction, no special safety measure is required for the intervention in the engine controller, because there is no risk of excessive engine speed or excessive engine torque. The torque setpoint signal may also be reduced below the torque desired by the driver by intervening in the ignition angle. Adjustment of the ignition angle usually results in a lower engine torque; therefore, vice-versa, the engine torque may also be increased again by correcting the ignition angle. The advantage of this procedure is that extremely rapid control of the engine torque and thus of the slip speed is possible due to the extremely high dynamics of the ignition angle intervention. However, since ignition angle intervention may occasionally result in considerable deterioration of the exhaust gas quality, reduction in the engine torque via ignition angle intervention should advantageously be limited to short time intervals in which a highly dynamic actuating signal is needed due to the driving situation. In a self-igniting engine (diesel engine), it may be furthermore advantageous to elevate the torque according to the present invention, which should ideally remain less than the torque corresponding to the smoke limit of the engine. Furthermore, the operation of a slip-regulated clutch, together with a temporary engine intervention, for example, to increase engine torque, may be advantageous, particularly in self-igniting engines. In this case, with a slip-regulated clutch having excessively low slip speed and therefore imminent seizing, this situation may be circumvented using limited-time quick engine intervention to increase the engine torque. This may occur, in particular, in cases where engine intervention and the subsequent change in engine torque is quicker than clutch regulation.

Regarding electronic regulating or control devices having the appropriate sensors and actuators, and the corresponding control or regulating methods in vehicles having automated clutches and transmissions, explicit reference is made to DE 40 11 850 A1, DE 44 26 260 A1, DE 197 45 677 A1, and EP 1 010 606 A1 to in this context. These references and U.S. Pat. Nos. 5,176,234 and 5,632,706 are hereby incorporated-by-reference herein.

In the control methods for automatic regulation of the slip of the friction clutch situated between the engine and the transmission of the motor vehicle, which has a positioning drive for adjusting the clutch, the clutch is adjusted at a position defined by a position setpoint signal. The clutch input speed and the clutch output speed are detected using rotational speed sensors, and the position setpoint signal is generated as a function of the difference between these rotational speeds, known as the slip speed, in such a way that the slip is equal to a predefined setpoint slip. The engine is controlled via a controllable adjusting device for the generated torque in such a way that the generated torque corresponds to a predefined setpoint torque. In addition to the position setpoint signal or instead of the position setpoint signal, a torque setpoint signal dependent on the slip is generated in such a way, and supplied to the torque adjusting device, that the instantaneous slip is equal to a predefined setpoint slip.

To control the slip, a programmable electronic control unit is usually provided, which has inputs connected to means for detecting the engine speed and/or the transmission speed and/or the tachometer shaft speed and/or the wheel speed and/or the speed of the intended and/or selected gear of the transmission and which has outputs for transmitting control signals to the electrically controllable clutch device and the electrically controllable engine.

BRIEF DESCRIPTION OF THE DRAWINGS

FIG. 1 shows a flowchart of on embodiment of the method of the present invention.

DETAILED DESCRIPTION

FIG. 1 shows a method for slip control of a clutch situated between an engine and a transmission of a motor vehicle. The clutch is regulated via a differential speed between a clutch input speed and a clutch output speed in step 10. Instead of or in addition to the modulated clutch torque transmissible by the differential speed as the control variable for the clutch, an engine torque is used as the control variable for the clutch as indicated in step 20.

What is claimed is:

1. A method for slip control of a clutch situated between an engine and a transmission of a motor vehicle, the method comprising:
    generating a position setpoint signal as a function of a differential speed between a clutch input speed and a clutch output speed;
    regulating the clutch using the position setpoint signal; and
    using an engine torque as a control variable for the clutch instead of or in addition to the position setpoint signal.

2. The method as recited in claim 1 wherein an instantaneous engine torque desired by a driver is determined from a position of the accelerator pedal and an instantaneous operating state of the engine so as to define a desired torque, and the desired torque is used as the control variable for the clutch to regulate clutch slip so that the transmissible clutch torque is adjusted to the desired torque and modulated accordingly.

3. The method as recited in claim 2 further comprising filtering the control variable for the transmissible clutch torque from sudden torque changes, low-frequency vibrations, and minor changes in the desired torque unintended by the driver.

4. The method as recited in claim 2 wherein the instantaneous engine torque is regulated so that the clutch slip corresponding to the instantaneous operating state of the engine is set at the clutch, the clutch slip being kept constant.

5. The method as recited in claim 4 wherein the actual engine torque is modulated to minimize exhaust gas emissions in the event of engine speed fluctuations less than/equal to a predefined speed threshold.

6. The method as recited in claim 5 wherein the threshold is 100 rpm.

7. The method as recited in claim 1 wherein the transmissible clutch torque is reduced by an adjustable fixed amount or by an adjustable factor with respect to a torque desired by the driver in an instantaneous operating state of the engine.

8. The method as recited in claim 7 wherein the fixed amount for reduction in the clutch torque with respect to the desired torque is 10 to 15 Nm.

9. The method as recited in claim 7 wherein the factor for reducing the clutch torque with respect to the torque desired by the driver is 0.93 to 0.96.

10. The method as recited in claim 1 wherein the engine torque is reduced via rapid short-term modification of an ignition angle, and a slip speed of the clutch is thus regulated to reduce the transmitted clutch torque.

11. A method for slip control of a clutch situated between an engine and a transmission of a motor vehicle, the method comprising:
    regulating the clutch via a differential speed between a clutch input speed and a clutch output speed, the differential speed being a control variable for modulating a clutch torque; and
    using an engine torque as a control variable for the clutch instead of or in addition to the clutch torque modulated by the first control variable;
    wherein an instantaneous engine torque desired by a driver is determined from a position of the accelerator pedal and an instantaneous operating state of the engine so as to define a desired torque, and the desired torque is used as the control variable for the clutch to regulate clutch slip so that the transmissible clutch torque is adjusted to the desired torque and modulated accordingly;
    wherein the instantaneous engine torque is regulated so that the clutch slip corresponding to the instantaneous operating state of the engine is set at the clutch, the clutch slip being kept constant.

12. The method as recited in claim 11 wherein the actual engine torque is modulated to minimize exhaust gas emissions in the event of engine speed fluctuations less than/equal to a predefined speed threshold.

13. The method as recited in claim 12 wherein the threshold is 100 rpm.

14. A method for slip control of a clutch situated between an engine and a transmission of a motor vehicle, the method comprising:
    regulating the clutch via a differential speed between a clutch input speed and a clutch output speed, the differential speed being a control variable for modulating a clutch torque; and
    using an engine torque as a control variable for the clutch instead of or in addition to the clutch torque modulated by the first control variable;
    wherein the transmissible clutch torque is reduced by an adjustable fixed amount or by an adjustable factor with respect to a torque desired by the driver in an instantaneous operating state of the engine.

15. The method as recited in claim 14 wherein the fixed amount for reduction in the clutch torque with respect to the desired torque is 10 to 15 Nm.

16. The method as recited in claim 14 wherein the factor for reducing the clutch torque with respect to the torque desired by the driver is 0.93 to 0.96.

17. A method for slip control of a clutch situated between an engine and a transmission of a motor vehicle, the method comprising:
    regulating the clutch via a differential speed between a clutch input speed and a clutch output speed, the differential speed being a control variable for modulating a clutch torque; and
    using an engine torque as a control variable for the clutch instead of or in addition to the clutch torque modulated by the first control variable;
    wherein the engine torque is reduced via rapid short-term modification of an ignition angle, and a slip speed of the clutch is thus regulated to reduce the transmitted clutch torque.

* * * * *